(12) United States Patent
Imaki et al.

(10) Patent No.: US 7,580,606 B2
(45) Date of Patent: Aug. 25, 2009

(54) METHOD OF FORMING AN OPTICAL FIBER

(75) Inventors: Osamu Imaki, Tokyo (JP); Yoshihiko Hamada, Tokyo (JP); Yoshichika Kato, Tokyo (JP); Keiichi Mori, Tokyo (JP); Kenji Kondou, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 12/231,392

(22) Filed: Sep. 2, 2008

(65) Prior Publication Data
US 2009/0003773 A1  Jan. 1, 2009

Related U.S. Application Data

(62) Division of application No. 11/973,836, filed on Oct. 9, 2007, now Pat. No. 7,505,658.

(30) Foreign Application Priority Data

Oct. 11, 2006  (JP) .............................. 2006-277719

(51) Int. Cl.
*G02B 6/00* (2006.01)
*G02B 6/02* (2006.01)
*G02B 6/36* (2006.01)
*B26F 3/00* (2006.01)
*B65H 35/10* (2006.01)
*B65H 35/00* (2006.01)
*B26F 3/02* (2006.01)

(52) U.S. Cl. .................. 385/134; 385/90; 385/123; 385/136; 225/96

(58) Field of Classification Search ............... 385/52, 385/53, 70, 85, 87, 90, 134, 136, 137, 147; 225/96
See application file for complete search history.

(56) References Cited

U.S. PATENT DOCUMENTS

| 4,711,519 A | 12/1987 | Smulders |
| 5,187,765 A | 2/1993 | Muehlemann et al. |
| 5,351,333 A | 9/1994 | Chambers |

(Continued)

FOREIGN PATENT DOCUMENTS

JP  05-224045  9/1993

(Continued)

OTHER PUBLICATIONS

First Office Action, Aug. 12, 2008, Imaki, O. et al.

*Primary Examiner*—Frank G Font
*Assistant Examiner*—Robert Tavlykaev
(74) *Attorney, Agent, or Firm*—David N. Lathrop

(57) ABSTRACT

Marker grooves of an optical fiber are formed by a marker groove forming device including at least, on a substrate, a fiber guide and optical fiber pressing springs formed on a side wall surface in the fiber guide. The optical fiber pressing springs include edges contacted and pressed to the side of an optical fiber stored in the fiber guide, and plate springs for pressing the edges to the side of the optical fiber with fulcra on the side wall surface in the fiber guide. The optical fiber is pressed to a side wall surface in the fiber guide, and the edges are formed at a predetermined distance from each other.

3 Claims, 9 Drawing Sheets

U.S. PATENT DOCUMENTS

| | | | |
|---|---|---|---|
| 5,384,874 A * | 1/1995 | Hirai et al. | 385/34 |
| 6,315,462 B1 | 11/2001 | Anthamatten et al. | |
| 6,473,553 B1 | 10/2002 | Jerman et al. | |
| 2002/0094185 A1 | 7/2002 | Hopkin et al. | |
| 2003/0128944 A1 | 7/2003 | Skutnik | |
| 2003/0128953 A1 * | 7/2003 | Marion | 385/137 |

FOREIGN PATENT DOCUMENTS

| | | |
|---|---|---|
| JP | 05-241047 | 9/1993 |
| JP | 08-021930 | 1/1996 |
| JP | 09-080268 | 3/1997 |
| JP | 2000-515986 | 11/2000 |
| JP | 2000-338363 | 12/2000 |
| JP | 2002-357737 | 12/2002 |
| JP | 2003-043270 | 2/2003 |
| JP | 2005-128407 | 5/2005 |
| JP | 2005-164886 | 6/2005 |
| JP | 2005-165016 | 6/2005 |
| JP | 2005-279919 | 10/2005 |
| WO | WO 98/00741 | 1/1998 |

* cited by examiner

FIG.2A
FIG.2B
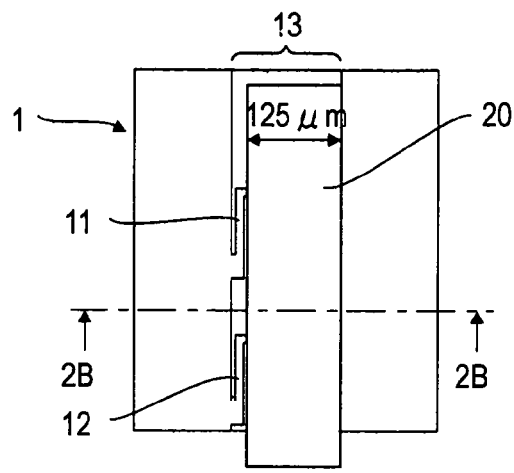
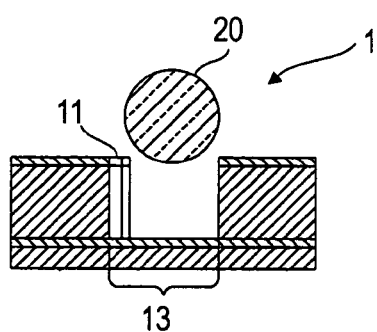
FIG.2C
FIG.2D
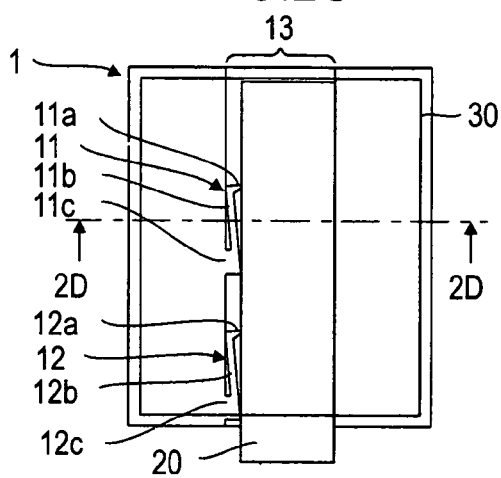
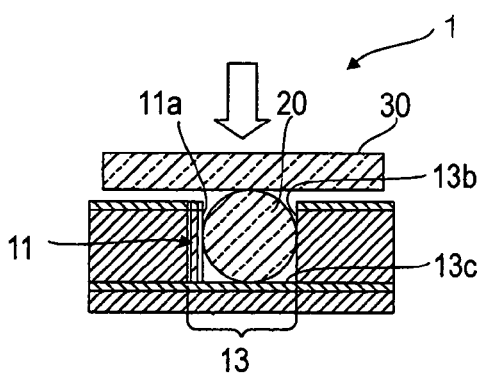
FIG.2E
FIG.2F
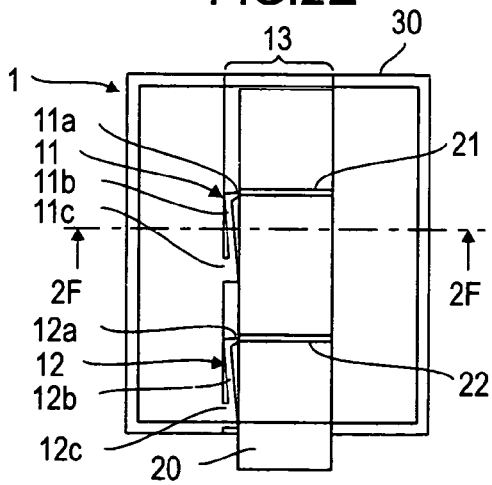
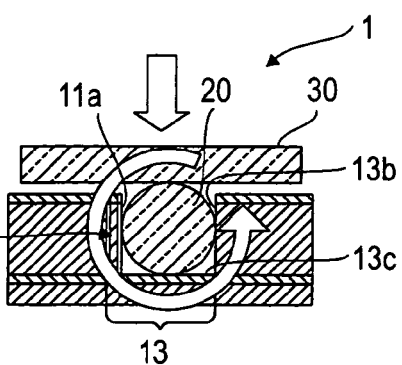

METHOD OF FORMING AN OPTICAL FIBER

BACKGROUND OF THE INVENTION

1. Field of the Invention

The present invention relates to a technique of positioning an optical fiber, and more particularly, to a technique of positioning an optical fiber in the axial direction.

2. Description of the Related Art

Patent document 1 (Japanese Patent Application Laid-Open No. H05-224045) discloses a method of contacting an end face of an optical fiber to an end face of an optical waveguide, as a method of positioning the optical fiber in the axial direction.

Further, patent document 2 (Japanese Patent Application Laid-Open No. H05-241047) and patent document 3 (Japanese Patent Application Laid-Open No. 2002-357737) each disclose a method of contacting a positioning wall or a positioning member to a part of an end face of an optical fiber, as a method of positioning the optical fiber in the axial direction. Patent document 4 (Japanese Patent Application Laid-Open No. 2005-164886) discloses a positioning method of contacting particularly a part of a diagonally polished end face of an optical fiber to the positioning wall of a fiber guide.

Patent document 5 (Japanese Patent Application Laid-Open No. 2003-43270) describes a method of forming an end of an optical fiber having a rod-like lens on the end face. Patent document 6 (Japanese Patent Application Laid-Open No. 2005-165016) describes a method of diagonally polishing an end face of an optical fiber having a lens.

In the method of patent document 1, the overall end face of an optical fiber is contacted to an end face of an optical waveguide to optically couple the optical fiber to the optical waveguide. Therefore, the method of patent document 1 cannot be applied to an optical module of spatial propagation type in which light emitted from an installed optical fiber propagates through the space.

In contrast to the method of patent document 1, in the methods of patent documents 2 and 3, a positioning wall and the like are contacted only to a part of an end face of an optical fiber and do not shade the light emitted from the optical fiber. Therefore, the methods of patent documents 2 and 3 are applicable to an optical module of spatial propagation type as well. However, the methods of patent documents 2 and 3 cannot be applied to an optical module including an optical fiber end having a diagonally polished end face which is frequently used to deal with reflected and returned light. For this reason, the applicant of the present application has proposed the method of patent document 4 beforehand in which positioning can be performed by contacting a part of a diagonally polished end face of a fiber to the positioning wall of a fiber guide.

In the method of patent document 4, however, the orientation of the axis of a spatial propagation of light which is incident on or emitted from an end face of an optical fiber is limited to ones parallel to the plane of a substrate having a fiber guide provided thereon. In other words, the method of patent document 4 cannot be applied to a module for achieving coupling of light to an optical element by making the light impinge upon or emit from it in an orientation not parallel to the plane but, for example, vertically upward or downward with respect to the plane of the substrate. In fact, an inclined contacting wall surface in accordance with that orientation is unable to be formed in substrate by means of ordinary etching techniques applicable for substrates.

In other words, first, the related art has no means for easily positioning an optical fiber end having a diagonal end face, in the axial direction at a given rotation angle while using the axis of the optical fiber as a rotation axis.

Further, in the methods of patent documents 2 to 4, it is necessary to contact a positioning wall and the like to at least a part of an end face of an optical fiber. Thus these methods cannot be applied to positioning in a process of connecting a rod-like lens to an end face of an optical fiber according to patent document 5 or positioning in a process of diagonally polishing an end face of an optical fiber end having a lens according to patent document 6. For this reason, in these processes, there is no other way but to visually recognize a fusion spliced interface of different kinds of optical waveguide members (an optical fiber and a rod-like optical waveguide which is a material of a rod-like lens) and determine a positioning reference for working these members. However, it is not always easy to visually recognize the fusion spliced interface of these members based on a small difference in index of refraction between these members.

In sum, secondly, the related art has no easily recognizable visual marker means, other than the fusion spliced interface, that serves as a positioning reference during the process of providing a rod-like lens to an end of an optical fiber or further polishing the end or it.

The present invention is designed in consideration of this point. An object of the present invention is to provide a technique capable of easily positioning an optical fiber in the axial direction without contacting a member to an end face of the optical fiber or visually recognizing a small difference in index of refraction between different kinds of optical waveguide members, while optionally adjusting the rotation angle of the optical fiber particularly even when the optical fiber has a diagonal end face.

SUMMARY OF THE INVENTION

In order to solve the problems, a first aspect of the present invention provides an optical fiber including an end having a marker groove formed by cutting the outer periphery of the cladding, the marker groove being formed on a position spaced at a fixed distance from an end face of the optical fiber in the axial direction.

In the case of such an optical fiber, it is possible to easily perform positioning in the axial direction of the optical fiber using the formed maker groove as a reference.

Further, in order to solve the problems, a second aspect of the present invention provides a marker groove forming device comprising a fiber guide and first optical fiber pressing springs formed on a substrate, wherein the fiber guide is a groove having two side wall surfaces perpendicular to the plane of the substrate and supporting the side of a stored optical fiber by the inner wall surface, the N (N≧2) first optical fiber pressing springs are formed on one of the side wall surfaces of the fiber guide, the first optical fiber pressing spring includes a first plate spring formed on one of the side wall surfaces and a first edge formed on the first plate spring on the side of the central direction of the fiber guide, the first plate spring presses the first edge formed on the first plate spring to the side of the optical fiber stored in the fiber guide with a fulcrum on one of the side wall surfaces, and the first edges are spaced at a predetermined distance from each other in the axial direction of the fiber guide.

When the optical fiber is stored in the fiber guide of the marker groove forming device configured thus and the stored optical fiber is rotated about the axis, the first edges of the first optical fiber pressing springs cut the outer periphery of the cladding of the optical fiber and form N parallel marker grooves at predetermined intervals on the optical fiber. Next, one of the N parallel marker grooves formed on the optical fiber is cleaved to form an optical fiber end face, so that the marker groove on an end of the optical fiber can be easily formed according to a first invention.

Preferably, the second aspect of the present invention further comprises M ($1 \leq M \leq N-1$) second optical fiber pressing springs formed on the side wall surface opposed to the side wall surface having the first optical fiber pressing springs formed thereon in the fiber guide, wherein the second optical fiber pressing spring includes a second plate spring formed on the side wall surface opposed to the side wall surface having the first optical fiber pressing springs formed thereon in the fiber guide and includes a second edge formed on the second plate spring on the side of the central direction of the fiber guide, the second plate spring presses the second edge formed on the second plate spring to the side of the optical fiber stored in the fiber guide with a fulcrum on the side wall surface opposed to the side wall surface having the first optical fiber pressing springs formed thereon in the fiber guide, each one of the second edges of all the second optical fiber pressing springs is disposed on any one of M planes, each one of the M planes passing through any one of the first edges of M of the first optical fiber pressing springs and perpendicular to the axis of the fiber guide.

When the optical fiber is stored in the fiber guide of the marker groove forming device configured thus and the optical fiber stored in the fiber guide is rotated about the axis by an angle larger than 0° and smaller than 360°, the first edges of the first optical fiber pressing springs and the second edges of the second optical fiber pressing springs cut the outer periphery of the cladding of the optical fiber and form parallel marker grooves at predetermined intervals on the optical fiber. Of the marker grooves formed by the first edges, a marker groove on a plane not including one of the marker grooves formed by the second edges is cleaved to form an optical fiber end face.

In this way, both of the necessary length of the marker groove for positioning the end face and the improved flatness of the cleavage surface at the end of the fiber are obtained at once (the detail will be described later).

According to a third aspect of the present invention, a rod-like optical waveguide member serving as a material of a rod-like lens is connected to the end face of the optical fiber of the first invention, and the connected rod-like optical waveguide member is cut or polished to a length determined relative to the marker groove, so that the rod-like lens is formed on the end of the optical fiber.

As described above, instead of the end face of the optical fiber, the marker groove formed on the outer periphery of the cladding is used as the reference for positioning in the axial direction. Thus the present invention is also applicable to positioning in the axial direction during working on the rod-like optical waveguide member connected to the end of the optical fiber. As a result, as compared with the related art in which an optical fiber is positioned by visually recognizing a small difference in index of refraction between different kinds of optical waveguide members, the optical fiber is positioned with great ease and the workload is reduced.

A fourth aspect of the present invention provides an optical fiber device comprising a positioning/fixing substrate having a fiber guide and an optical fiber pressing spring formed thereon, and the optical fiber according to the first aspect of the present invention stored in the fiber guide, wherein the fiber guide is a groove having two side wall surfaces perpendicular to the plane of the positioning/fixing substrate and supporting the side of the stored optical fiber by the inner wall surface, the optical fiber pressing spring includes a plate spring formed on a fixed position of one of the side wall surfaces in the fiber guide and an edge formed on the plate spring on the side of the central direction of the fiber guide, the plate spring presses the edge to the side of the optical fiber with a fulcrum on one of the side wall surfaces, and the end of the optical fiber is positioned in the axial direction relative to the positioning/fixing substrate by aligning the marker groove formed on the optical fiber with the edge of the optical fiber pressing spring.

In this configuration, since the optical fiber is positioned in the axial direction relative to the positioning/fixing substrate by aligning the marker groove formed on the outer periphery of the cladding with the edge of the pressing spring, then it is possible to easily configure an optical fiber device of spatial propagation type and further adjust the axial rotation angle of the optical fiber when necessary.

As described above, the present invention makes it possible to easily position an optical fiber in the axial direction without contacting a member to an end face of the optical fiber or visually recognizing a small difference in index of refraction between different kinds of optical waveguide members.

BRIEF DESCRIPTION OF THE DRAWINGS

FIGS. 2A to 2F are explanatory drawings showing a first step of forming a cleaving marker groove and an end face positioning marker groove on an end of an optical fiber;

FIGS. 2A, 2C and 2E are plan views showing a marker groove forming device 1 in the first step;

FIGS. 2B, 2D and 2F are sectional views taken along lines 2B-2B, 2D-2D and 2F-2F of FIGS. 2A, 2C and 2E;

FIG. 3A shows the optical fiber on which two parallel marker grooves have been formed in the first step;

FIG. 3B shows the optical fiber on which an optical fiber end face has been formed by cleaving the cleaving marker groove;

FIG. 4A shows the optical fiber having an end on which the end face positioning marker groove has been formed by cutting;

FIG. 4B shows an optical device having a lens connected to an end face of the optical fiber shown in FIG. 4A;

FIG. 4C shows an optical device in which the lens of FIG. 4B has a diagonally polished end face;

FIG. 5A is a plan view of the filter module;

FIG. 5B is a sectional view taken along line 5B-5B of FIG. 5A;

FIGS. 7A, 7C, 7E and 7G are plan views showing a substrate on which the fiber guide and the fiber guide pressing springs are formed;

FIGS. 7B, 7D, 7F and 7H are sectional views taken along lines 7B-7B, 7D-7D, 7F-7F and 7H-7H of FIGS. 7A, 7C, 7E and 7G;

FIGS. 9A and 9C are plan views showing a marker groove forming device in a first step;

FIGS. 9B and 9D are sectional views taken along lines 9B-9B and 9D-9D of FIGS. 9A and 9C; and FIGS. 9E and 9F are plan views showing the marker groove forming device in a second step.

DETAILED DESCRIPTION OF THE PREFERRED EMBODIMENT

Best modes for carrying out the invention will be now described with reference to the accompanying drawings.

First Embodiment

First, a first embodiment of the present invention will now be described below.

<Marker Groove Forming Device 1 of the Present Embodiment>

Figure 1A:
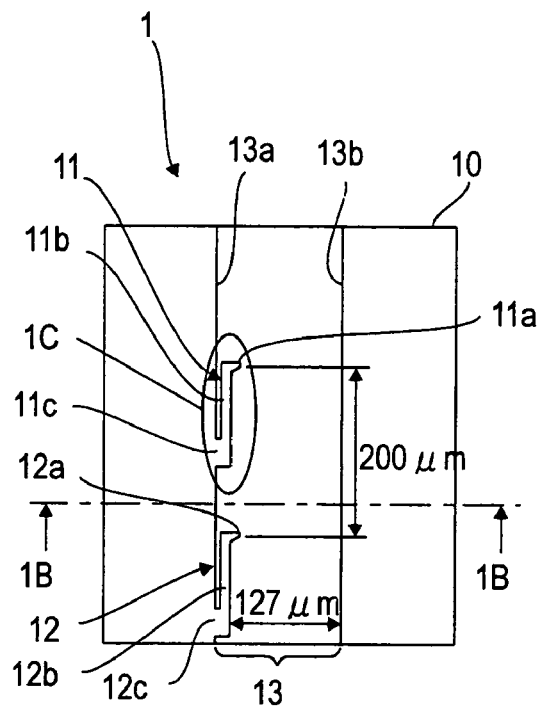
FIG. 1A is a plan view showing the configuration of a marker groove forming device according to a first embodiment.
Figure 1B:
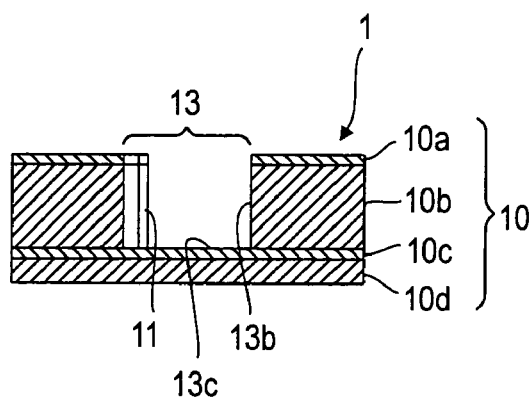
FIG. 1B is a sectional view taken along line 1B-1B of FIG. 1A.
Figure 1C:
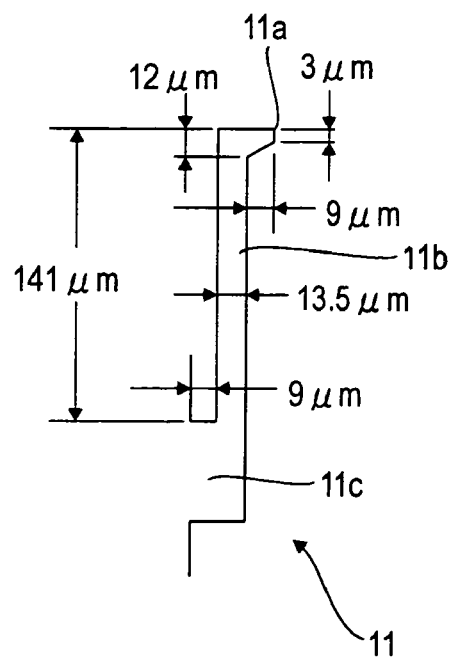
FIG. 1C is an enlarged view showing 1C of FIG. 1A.

FIG. 1A is a plan view showing the configuration of a marker groove forming device 1 of the first embodiment. FIG. 1B is a sectional view taken along line 1B-1B of FIG. 1A. FIG. 1C is an enlarged view showing 1C of FIG. 1A.

As shown in FIGS. 1A and 1B, the marker groove forming device 1 of the present embodiment comprises a fiber guide 13 and two optical fiber pressing springs 11 and 12 (both corresponding to a "first optical fiber pressing spring") which are formed on a substrate 10. The fiber guide 13 has two side wall surfaces 13a and 13b which are perpendicular to the plane of the substrate 10 and are parallel to each other, and the fiber guide 13 supports the side of a stored optical fiber by the inner wall surface. The optical fiber pressing springs 11 and 12 of this example are formed on the side wall surface 13a of the fiber guide 13. The optical fiber pressing springs 11 and 12 respectively comprise plate springs 11b and 12b (corresponding to a "first plate spring") formed on the side wall surface 13a and edges 11a and 12a (corresponding to a "first edge") formed on the plate springs 11b and 12b on the side of the central direction of the fiber guide. The plate springs 11b and 12b press the edges 11a and 12a formed thereon to the side of the optical fiber stored in the fiber guide 13, by using the side wall surface 13a of the fiber guide 13 as a fulcrum. The edges 11a and 12a are spaced at a predetermined distance from each other in the axial direction of the fiber guide 13. In the present embodiment, terms "perpendicular" and "parallel" do not only mean mathematically strict "perpendicular" and "parallel". Thus concepts of "perpendicular" and "parallel" include "substantially perpendicular" and "substantially parallel" as long as the effect of the present embodiment can be obtained.

The configuration of the marker groove forming device 1 of the present embodiment will be specifically described below.

The substrate 10 of the present embodiment is formed of, for example, two layers of silicon substrates. In the silicon substrates, insulating layers 10a and 10c which are oxide films are formed on the surfaces of silicon layers 10b and 10d. The fiber guide 13 and the optical fiber pressing springs 11 and 12 are formed by performing, for example, dry etching on the substrate 10 configured thus (the fabrication method will be described later). As shown in FIG. 1B, the fiber guide 13 of the present embodiment is a rectangular groove in cross section. To be specific, an underside 13c in the fiber guide 13 is a rectangular plane and the side wall surfaces 13a and 13b on both sides are rectangular planes formed perpendicularly to the underside 13c and parallel to each other. The depth of the fiber guide 13 is smaller than the diameter of the optical fiber. In other words, the heights of the side wall surfaces 13a and 13b relative to the underside 13c are smaller than the diameter of the optical fiber having maker grooves formed thereon.

The ends of the plate springs 11b and 12b of the optical fiber pressing springs 11 and 12 are integrally formed with the side wall surface 13a via fulcra 11c and 12c. The plate springs 11b and 12b are disposed in parallel with the side wall surface 13a while being spaced at a predetermined distance from the side wall surface 13a in a natural state. The edges 11a and 12a protruding to the opposed side wall surface 13b are integrally formed on the ends of the plate springs 11b and 12b (FIGS. 1A and 1C). The positions of the formed optical fiber pressing springs 11 and 12 are determined according to the positions of marker grooves to be formed on the optical fiber. To be specific, the positions of the formed optical fiber pressing springs 11 and 12 are determined such that a distance between the edges 11a and 12a is equal to a distance between marker grooves to be formed on the optical fiber (a distance between marker grooves including a cleaving marker groove and a positioning marker groove). Considering accuracy of fixing, to an optical fiber device relative to the positioning marker groove, an end face of the optical fiber having the positioning marker groove formed thereon by the marker groove forming device 1, and considering accuracy of additional working on the end face, it is desirable to minimize the distance between the edges 11a and 12a (the distance between the marker grooves). However, when the distance is too small, it is difficult to positively cleave the optical fiber only at the single point of the cleaving marker groove. Therefore, it is desirable to minimize the distance without interfering with cleavage. The value of the distance is, for example, about 200 μm.

Further, the positions of the plate springs 11b and 12b and the edges 11a and 12a relative to the side wall surface 13b in a natural state are determined by the diameter of the optical fiber to have the marker grooves formed thereon. To be specific, a distance between the side wall surface 13b and the surfaces of the plate springs 11b and 12b on the side of the side wall surface 13b is set slightly longer than the diameter of the optical fiber, and a distance between the side wall surface 13b and the ends of the edges 11a and 12a is set shorter than the diameter of the optical fiber. In short, the optical fiber can be rotated about the axis while the edges 11a and 12a press the side of the optical fiber. The same configuration as the optical fiber pressing springs 11 and 12 is also described in, for example, U.S. Pat. No. 6,315,462.

For example, when a cleaving marker groove and a positioning marker groove are formed at a distance of 200 μm in the axial direction on an optical fiber having a diameter of 125 μm and the cleaving marker groove is cleaved to form an end face, the dimensions of the constituent parts are set, for example, as shown in FIGS. 1A and 1C. In other words, as shown in FIG. 1A, the optical fiber pressing springs 11 and 12 of this example are identical to each other and a distance between the ends of the edges 11a and 12a is set at 200 μm. Further, in a natural state, a distance between the side wall surface 13b and the surfaces of the edges 11a and 12a on the side of the side wall surface 13b is set at 127 μm, which is longer than the 125-μm diameter of the optical fiber by only 2 μm. As shown in FIG. 1C, in this example, a distance between the side wall surface 13a and the edge 11a on the side of the side wall surface 13a is 9 μm, the length of the plate spring 11b is 141 μm, and the thickness of the plate spring 11b is 13.5 μm. As shown in FIG. 1C, the edge 11a of this example is formed in the 12-μm range on the side edge of the end of the plate spring 11b on the side of the side wall surface 13b. The end of the edge 11a is 3 μL in width. These dimensions are merely an example.

<Method of Forming an End of the Optical Fiber According to the Present Embodiment>

The following is a method of forming an end of the optical fiber according to the present embodiment.

[First Step]

In a first step, the cleaving marker groove and the end face positioning marker groove are formed on an end part of the optical fiber by using the marker groove forming device 1 of the present embodiment.

FIG. 2 is an explanatory drawing showing the first step of forming the cleaving marker groove and the end face positioning marker groove on the end part of the optical fiber. FIGS. 2A, 2C and 2E are plan views showing the marker groove forming device 1 in the first step. FIGS. 2B, 2D and 2F are sectional views taken along lines 2B-2B, 2D-2D and 2F-2F of FIGS. 2A, 2C and 2E.

In the first step of the present embodiment, an optical fiber 20 stored in the fiber guide 13 is rotated about the axis, so that the edges 11a and 12a of the optical fiber pressing springs 11 and 12 cut the outer periphery of the cladding of the optical fiber 20 to form the two parallel marker grooves at a predetermined interval from each other (an interval between the edges 11a and 12a) on the optical fiber 20. The first step will be described below.

First, as shown in FIGS. 2A to 2D, the optical fiber 20 having a diameter of 125 μm is stored in the fiber guide 13 of the marker groove forming device 1. The optical fiber 20 is stored as follows: the optical fiber 20 is placed on the fiber guide 13 as shown in FIG. 2A, and then the side of the optical fiber 20 is pressed to the underside 13c of the fiber guide 13 by means of a glass plate 30 as shown in FIG. 2D. This assures that no grooves other than the marker grooves are formed on the optical fiber 20 in this storing process. In this storing process, the side of the optical fiber 20 presses the edges 11a and 12a of the optical fiber pressing springs 11 and 12 to the side wall surface 13a. On the other hand, the edges 11a and 12a press the side of the optical fiber 20 by an elastic force applied from the plate springs 11b and 12b with the fulcra 11c and 12c on the side wall surface 13a.

As shown in FIGS. 2C and 2D, the optical fiber 20 stored in the fiber guide 13 is supported by the underside 13c and the side wall surface 13b of the fiber guide 13, the edges 11a and 12a, and portions around the fulcra 11c and 12c of the plate springs 11b and 12b. In this state, the side of the optical fiber 20 is contacted and pressed to the edges 11a and 12a and pressed to the side wall surface 13b. In this configuration, since the depth of the fiber guide 13 is smaller than the diameter of the optical fiber 20, a part (top) of the side of the optical fiber 20 stored thus in the fiber guide 13 is placed out of the fiber guide 13 (FIG. 2D).

Next, as shown in FIGS. 2E and 2F, the optical fiber 20 is rotated about the axis while the pressure of the glass plate 30 is kept. Thus the edges 11a and 12a of the optical fiber pressing springs 11 and 12 having been contacted and pressed to the side of the optical fiber 20 cut the outer periphery of the cladding of the optical fiber 20. As a result, two parallel grooves, that are the cleaving marker groove 21 and the end face positioning marker groove 22, are formed at an interval equal to that between the edges 11a and 12a, on the outer periphery of the clad of the optical fiber 20.

The optical fiber 20 is rotated about the axis by, for example, causing holding means attached to a rotating stage to hold the optical fiber 20 placed out of the substrate 10 in the axial direction of the fiber guide 13. In this case, it is desirable that the holding means hold the optical fiber 20 at a point as close to the substrate 10 as possible. This helps the optical fiber can be prevented from being displaced in the axial direction during the rotation of the optical fiber 20 about the axis.

When the optical fiber 20 is rotated by 360° or more about the axis, the cleaving marker groove 21 and the end face positioning marker groove 22 are formed around the outer periphery of the cladding of the optical fiber 20. In view of ease of positioning of the optical fiber 20, it is desirable that the end face positioning marker groove 22 be formed in a long length and more desirable is the one being formed all around the outer periphery of the cladding of the optical fiber 20. However, for cleavage, it is not necessary to form the cleaving marker groove 21 around the outer periphery of the clad. In consideration of the accuracy of a cleavage plane, it is desirable that the cleaving marker groove 21 be not too long. Further, in consideration of only the strength of the optical fiber 20, it is desirable not to form the end face positioning marker groove 22 all around the outer periphery of the cladding. In short, it is desirable to rotate the optical fiber 20 about the axis such that the end face positioning marker groove 22 is formed with the minimum necessary length required for ease of positioning the optical fiber 20.

[Second Step]

Figure 3A:
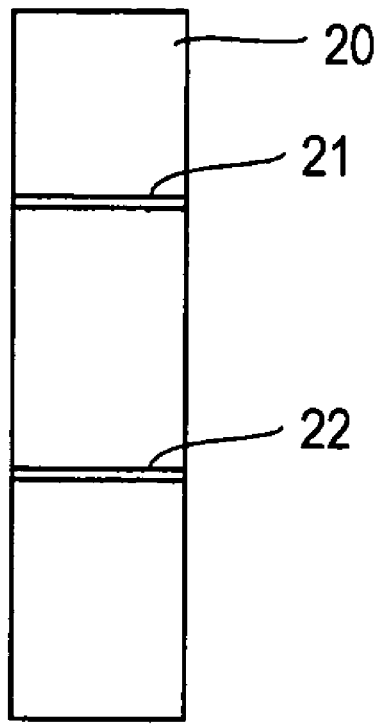
FIGS. 3A and 3B are explanatory drawings showing a second step of forming an end face of an optical fiber by cleaving the cleaving marker groove of the optical fiber.
Figure 3B:
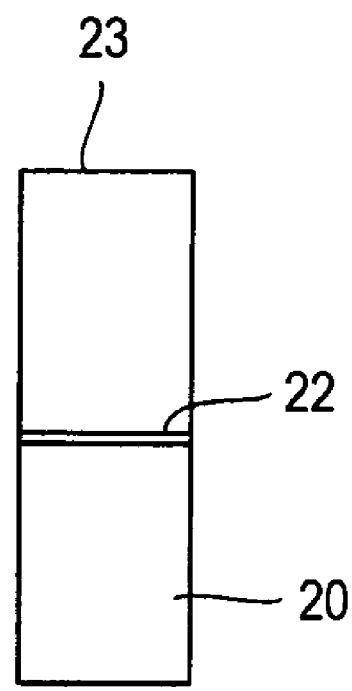

After the first step, a second step is performed. FIGS. 3A and 3B are explanatory drawings showing the second step of forming an end face of the optical fiber by cleaving the cleaving marker groove of the optical fiber. FIG. 3A shows the optical fiber 20 on which the two parallel marker grooves have been formed in the first step. FIG. 3B shows the optical fiber 20 on which an optical fiber end face 23 (cleavage plane) is formed by cleaving the cleaving marker groove.

As shown in FIGS. 3A and 3B, of the two parallel marker grooves (the cleaving marker groove 21 and the end face positioning marker groove 22) having been formed on the optical fiber 20 in the first step, the cleaving marker groove 21 is cleaved to form the optical fiber end face 23 in the second step. Thus, as shown in FIG. 3B, the optical fiber 20 is formed with an end part on which the end face positioning marker groove 22 is formed on the outer periphery of the cladding by cutting on a position spaced at a predetermined distance (200 μm in this example) from the end face in the axial direction.

<Connection/Working of an Optical Waveguide Member on an End Face of the Optical Fiber>

The following is a method of connecting and working an optical waveguide member on an end face of the optical fiber 20. The optical fiber 20 has an end part on which the end face positioning marker groove 22 is formed by cutting as described above.

Figure 4A:
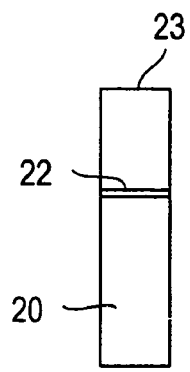
FIGS. 4A, 4B and 4C are explanatory drawings showing a method of connecting and working an optical waveguide member on an end face of the optical fiber having an end on which the end face positioning marker groove has been formed by cutting.
Figure 4B:
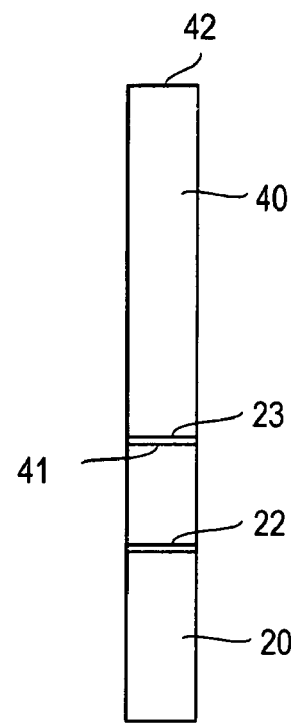
Figure 4C:
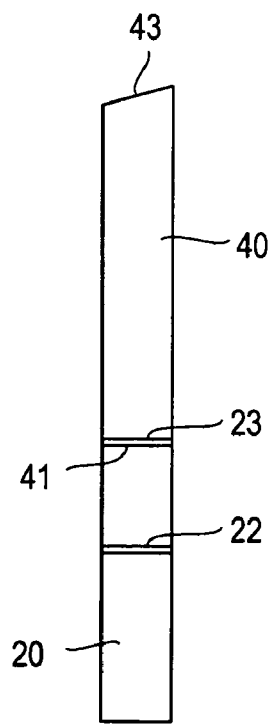

FIGS. 4A to 4C are explanatory drawings showing the method of connecting and working an optical waveguide member on the end face of the optical fiber 20 having an end part on which the end face positioning marker groove 22 is formed by cutting.

First, a rod-like optical waveguide member serving as a material of a rod-like lens is connected by fusion splicing to the end face 23 of the optical fiber 20 (FIG. 4A) having an end part on which the end face positioning marker groove 22 is formed by cutting. Next, on the connected rod-like optical waveguide member, a cut face 42 is determined relative to the end face positioning marker groove 22. The optical waveguide member is cut with a predetermined length to form a lens 40 (FIG. 4B). When necessary, the cut face 42 of the lens 40 may be diagonally polished relative to the end face positioning marker groove 22 to form a diagonally polished face 43 (FIG. 4C).

<Optical Fiber Device>

The following will describe an optical fiber device configured such that an optical fiber having an end part on which the end face positioning marker groove is formed by cutting as described above or an end part of an optical fiber having a rod-like lens provided on the end face is positioned and fixed on a positioning/fixing substrate.

[Filter Module]

Figure 5A:
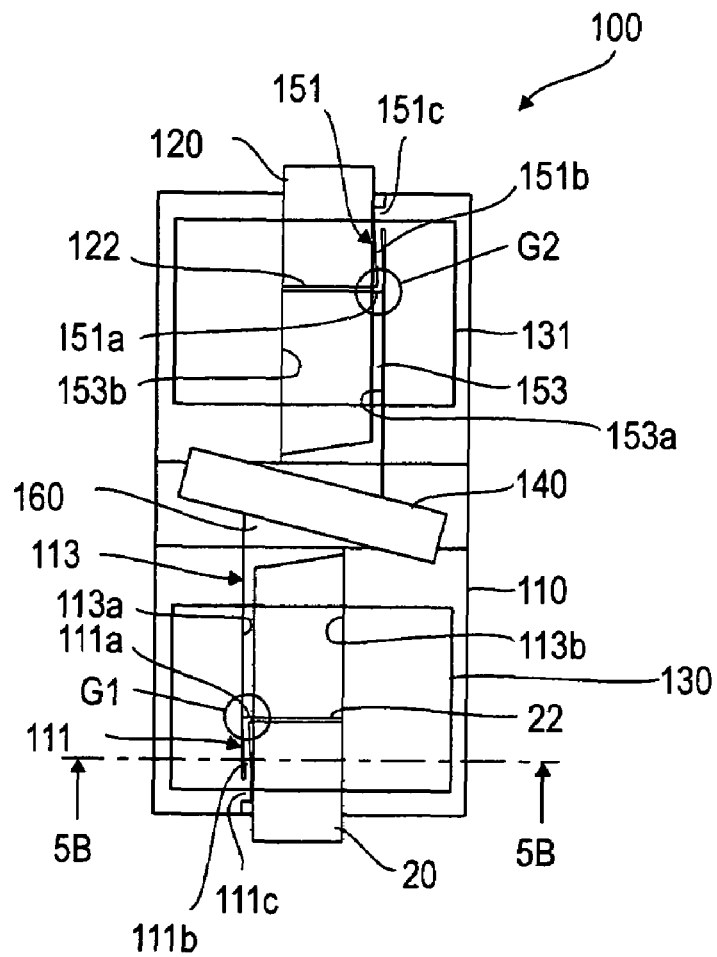
FIGS. 5A and 5B show the configuration of a filter module as an example of an optical fiber device.
Figure 5B:
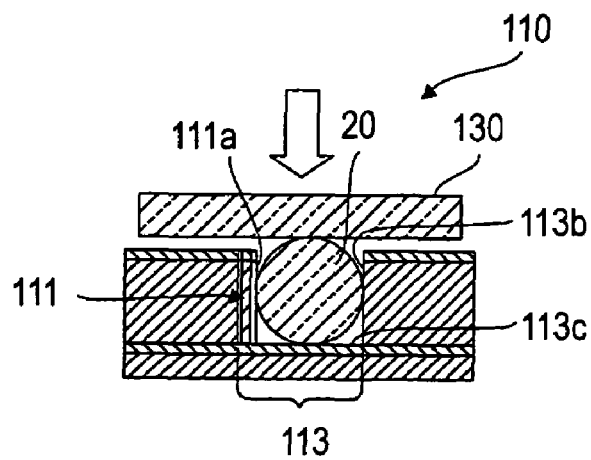

FIGS. 5A and 5B show the configuration of a filter module 100 as an example of such an optical fiber device. FIG. 5A is a plan view of the filter module 100 and FIG. 5B is a sectional view taken along line 5B-5B of FIG. 5A.

As shown in FIGS. 5A and 5B, the filter module 100 of this example comprises a positioning/fixing substrate 110 such as a silicon substrate on which two fiber guides 113 and 153 and optical fiber pressing springs 111 and 151 are formed, two optical fibers 20 and 120 respectively stored in the two fiber guides 113 and 153, two transparent glass plates 130 and 131, and an optical filter 140. The optical fibers 20 and 120 stored in the fiber guides 113 and 153 have end face positioning marker grooves 22 and 122 formed on the respective outer peripheries of the claddings, and the end faces of the optical fibers are diagonally polished.

The fiber guide 113 is a groove having two side wall surfaces 113a and 113b which are perpendicular to the plane of the positioning/fixing substrate 110 and are parallel to each other, and the fiber guide 113 supports the side of the stored optical fiber 20 by the inner wall surface. Similarly, the fiber guide 153 is a groove having two side wall surfaces 153a and 153b which are perpendicular to the plane of the positioning/fixing substrate 110 and are parallel to each other, and the fiber guide 153 supports the side of the stored optical fiber 120 by the inner wall surface. In this example, the fiber guides 113 and 153 are rectangular in cross section and the ends of the fiber guides 113 and 153 are connected to each other via a joint 160. Further, in this example, the axes of the fiber guides 113 and 153 are displaced from each other in consideration of the angles of refraction of light emitted from the optical fibers 20 and 120 stored in the fiber guides 113 and 153. The optical filter 140 is disposed on the joint 160 between the fiber guides 113 and 153. The optical filter 140 is disposed such that light emitted from one of the optical fibers 20 and 120 passes through the optical filter 140 and is optically coupled to the other optical fiber.

The optical fiber pressing springs 111 and 151 are provided on the predetermined positions of the side wall surfaces 113a and 153a in the fiber guides 113 and 153. Like the optical fiber pressing spring 11 and so on of the marker groove forming device 1, the optical fiber pressing springs 111 and 151 press the optical fibers 20 and 120 stored in the fiber guides 113 and 153 to the side wall surfaces 113b and 153b in the fiber guides 113 and 153. The side wall surfaces 113b and 153b are opposed to the optical fiber pressing springs 111 and 151, respectively. The optical fiber pressing spring 111 comprises a plate spring 111b formed on a fixed position on the side wall surface 113a in the fiber guide 113 and an edge 111a formed on the plate spring 111b on the side of the central direction of the fiber guide 113. The optical fiber pressing spring 151 comprises a plate spring 151b formed on a fixed position on the side wall surface 153a in the fiber guide 153 and an edge 151a formed on the plate spring 151b on the side of the central direction of the fiber guide 153. With this configuration, the plate springs 111b and 151b press the edges 111a and 151a to the sides of the optical fibers 20 and 120 with the side wall surfaces 113a and 153a serving as fulcra.

On that basis, by aligning the marker grooves 22 and 122 formed on the end parts of the optical fibers 20 and 120 with the edges 111a and 151a of the optical fiber pressing springs 111 and 151 respectively, positioning of the end parts of the optical fibers 20 and 120 in the axial direction relative to the positioning/fixing substrate 110 is achieved. After that, the optical fibers 20 and 120 stored in the fiber guides 113 and 153 are bonded and fixed to the positioning/fixing substrate 110 together with the two glass plates 130 and 131 which cover the optical fibers 20 and 120, so that the filter module 100 such as an attenuator is configured.

The following will describe a method of storing the end parts of the optical fibers 20 and 120 in the fiber guides 113 and 153, positioning them in the axial directions, and bonding and fixing the end parts of the optical fibers 20 and 120 on the positioning/fixing substrate 110 together with the glass plates 130 and 131.

First, the end parts of the optical fibers 20 and 120 are disposed in the openings of the fiber guides 113 and 153, respectively. Further, as shown in FIGS. 5A and 5B, the end parts of the optical fibers 20 and 120 are covered with the glass plates 130 and 131. Next, as shown in FIG. 5B, the glass plates 130 and 131 are pressed from the above of the positioning/fixing substrate 110. Thus the end parts of the optical fibers 20 and 120 are stored in the fiber guides 113 and 153, respectively.

Next, the positions of the optical fibers 20 and 120 are adjusted in the axial directions while keeping the pressing state. To be specific, an operator visually recognizes the end parts of the optical fibers 20 and 120 through the glass plates 130 and 131 from the above of the positioning/fixing substrate 110 by using a microscope and the like; meanwhile the operator moves the ends of the optical fibers 20 and 120 in the axial directions. In this way, the positioning marker grooves 22 and 122 formed on the end parts of optical fibers 20 and 120 (G1, G2) are aligned with the edges 111a and 151a of the optical fiber pressing springs 111 and 151, so that the positions of the ends of the optical fibers 20 and 120 in the axial directions are determined relative to the positioning/fixing substrate 110.

Further, the operator rotates the end parts of the optical fibers 20 and 120 about the axes and adjusts the rotation angles of the optical fibers while keeping their determined positions in the axial directions. To be specific, the operator visually recognizes the angles of end faces of the optical fibers 20 and 120 directly from the above in the same way while rotating the end parts of the optical fibers 20 and 120 about the axes, and finally determines the rotation angles of the end parts of the optical fibers 20 and 120 such that the axes of lights emitted from the end faces of the optical fibers that propagate in the air are and are incident on and emitted from the optical filter 140 are parallel to the plane of the positioning/fixing substrate.

In this state, from positions not covered with the glass plates 130 and 131, an ultraviolet curing adhesive, for example, is applied. Thus the adhesive spreads itself into a clearance among the optical fiber 20 under the glass plate 130, the fiber guide 113, and the glass plate 130 and a clearance among the optical fiber 120 under the glass plate 131, the fiber guide 153, and the glass plate 131. In this state, the optical fibers, the fiber guides, and the glass plates are irradiated with ultraviolet rays and thus are bonded and fixed to one another. The filter module 100 such as an attenuator is configured thus.

[Optical Switch]

Figure 6A:
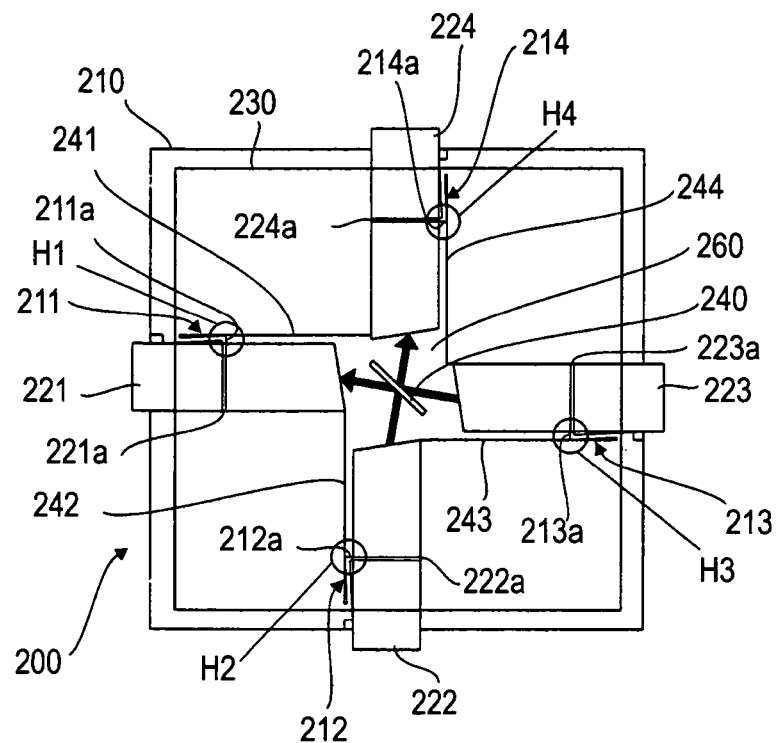
FIGS. 6A and 6B are plan views showing the configuration of an optical switch as another example of an optical fiber device.
Figure 6B:
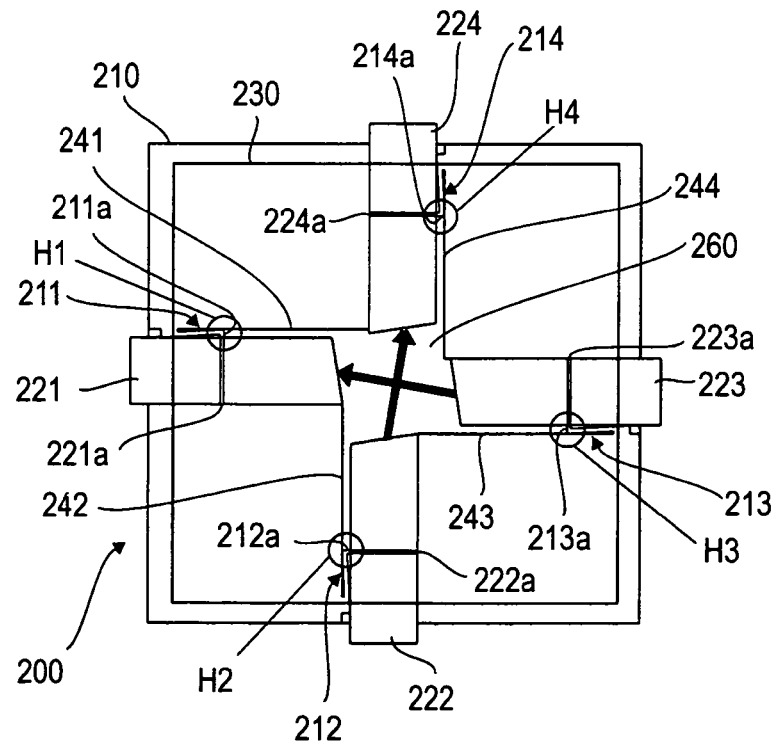

FIGS. 6A and 6B are plan views showing the configuration of an optical switch 200 as another example of an optical fiber device.

As shown in FIGS. 6A and 6B, the optical switch 200 of this example comprises a positioning/fixing substrate 210 such as a silicon substrate on which four fiber guides 241 to 244 and optical fiber pressing springs 211 to 214 are formed, four optical fibers 221 to 224 respectively stored in the four fiber guides 241 to 244, a transparent glass plate 230, and a movable mirror 240.

The stored optical fibers 221 to 224 have end face positioning marker grooves 221a to 224a formed outside the respective claddings, and the end faces of the optical fibers are diagonally polished.

The fiber guides 241 to 244 of this example are rectangular in cross section like the abovementioned fiber guide 113 and so on. Further, the ends of the fiber guides 241 to 244 are joined substantially like a cross via a joint 260. In this case, considering angles of refraction of light emitted from the stored optical fibers 221 to 224, the fiber guides 241 and 243 having opposed end faces and the fiber guides 242 and 244 having opposed end faces are arranged such that the axes are displaced from each other. Further, the movable mirror 240 is disposed in the joint 260 of the fiber guides 241 to 244 in a way that it can be inserted in the place and withdrawn therefrom (for example, the movable mirror 240 is pulled downward from the place in perpendicular direction into a recess formed at the bottom of the joint 260). With the fiber guides 241 to 244 and the movable mirror 240, when the movable mirror 240 is inserted to the joint 260 (FIG. 6A), light emitted from the optical fiber 222 stored in the fiber guide 242 is reflected on the movable mirror 240 and is coupled to the optical fiber 221 stored in the fiber guide 241, and light emitted from the optical fiber 223 stored in the fiber guide 243 is reflected on the movable mirror 240 and is coupled to the optical fiber 224 stored in the fiber guide 244. When the movable mirror 240 is removed from the joint 260 (FIG. 6B), light emitted from the optical fiber 223 is coupled to the optical fiber 221 and light emitted from the optical fiber 222 is coupled to the optical fiber 224.

The optical fiber pressing springs 221 to 214 are respectively provided on the fixed positions of side wall surfaces in the fiber guides 241 to 244. Like the optical fiber pressing springs of the marker groove forming device 1, the optical fiber pressing springs 211 to 214 press the optical fibers 221 to 224 stored in the fiber guides 241 to 244 to the side wall surfaces in the fiber guides 241 to 244 that are respectively opposed to the optical fiber pressing springs 211 to 214.

And, the edges 211a to 214a of the optical fiber pressing springs 211 to 214 are aligned with the marker grooves 221a to 224a formed on the end parts of the optical fibers 221 to 224, so that the ends of the optical fibers 221 to 224 are positioned in the axial directions relative to the positioning/fixing substrate 210. With the rotational angles about their axes of the end parts of them adjusted properly in addition, the optical fibers 221 to 224 stored in the fiber guides 241 to 244 are bonded and fixed to the positioning/fixing substrate 210 together with the glass plate 230 which covers the optical fibers 221 to 224, so that the optical switch 200 is configured.

A method of storing the ends of the optical fibers 221 to 224 in the fiber guides 241 to 244, positioning the optical fibers both in the axial directions and in their rotational angles, and bonding and fixing the ends of the optical fibers 221 to 224 on the positioning/fixing substrate 210 together with the glass plate 230 may be basically similar to the method of the filter module 100.

In other words, first, the end parts of the optical fibers 221 to 224 disposed on the fiber guides 241 to 244 are pressed from the above of the positioning/fixing substrate 210 by the transparent glass plate 230 to be stored in the fiber guides 241 to 244. Thereafter, the end parts of the optical fibers 221 to 224 are positioned in the axial directions while keeping the pressing state by an operator who visually recognizes the end parts of the optical fibers 221 to 224 through the glass plate 230 from the above of the substrate by using, for example, a microscope and the like. In that way, the positioning marker grooves 221a and 224a formed on the end parts of the optical fibers 221 and 224 (H1-H4) are aligned with the edges 211a to 214a of the optical fiber pressing springs 211 to 214, so that the ends of the optical fibers 221 to 224 are properly positioned in the axial directions relative to the positioning/fixing substrate 210.

Further, adjusting the rotation angles of the optical fibers 221 to 224 and bonding and fixing the optical fibers 221 to 224 are preformed in processes that may be basically similar to those of the filter module 100. However, in the case of the optical switch, the rotation angles of the optical fibers may be preferably adjusted in an active manner to obtain better optical couplings, in which the coupled light intensity is monitored during adjusting the angle.

If desired, generally, the glass plate for applying a pressure may possibly not cover the marker groove of the optical fiber but may cover just a part near the marker groove, so that the operator can recognize the marker groove directly, not through the glass plate, while aligning it with the edge of the pressing spring.

The above explanation specifically described, as an optical fiber device, the filter module and the optical switch in which the axes of light propagating through the air are both parallel to the plane of the substrate. However, the optical fiber having the positioning marker groove according to the present invention and the fiber positioning technique using it can be also preferably used for an optical fiber device in which light is incident on or emitted from an optical fiber end in a direction not parallel to the plane of a substrate having the optical fiber placed thereon (for example, a device which couples light to an optical element by making it traverse perpendicularly to the plane of substrate, see Japanese Patent Application Laid-Open No. H08-21930). This is because the optical fiber having a positioning marker groove according to the present invention can be positioned at any given rotation angle on the substrate.

<A Method of Fabricating the Fiber Guide and the Optical Fiber Pressing Springs>

A method of fabricating the fiber guide and the optical fiber pressing springs will be described below. The following is the method of fabricating the fiber guide and the optical fiber pressing springs of the marker groove forming device 1 shown in FIG. 1 and so on. Yet, this method is also applicable to the fabrication of the fiber guides and the optical fiber pressing springs of the filter module and the optical switch which are shown in FIGS. 5 and 6.

FIGS. 7A to 7H are explanatory drawings showing the method of fabricating the fiber guide and the optical fiber pressing springs. FIGS. 7A, 7C, 7E and 7G are plan views showing the substrate on which the fiber guide and the fiber guide pressing springs are formed. FIGS. 7B, 7D, 7F and 7H are sectional views taken along lines 7B-7B, 7D-7D, 7F-7F and 7H-7H of FIGS. 7A, 7C, 7E and 7G.

The substrate 10 can be, for example, a silicon substrate having a two-layer structure. The second silicon layer 10b has a thickness corresponding to the depth of the fiber guide 13, and the insulating layer 10a which is an oxide film is formed on a surface of the silicon layer 10b. The insulating layer 10c which is an oxide film is formed on the underside of the silicon layer 10b, and the first silicon layer 10d is formed on the underside of the insulating layer 10c.

[First Step]

First, the surface of the insulating layer 10a of the substrate 10 is coated with a resist layer 15 made of, for example, a photo-curing resin. Next, the shapes of the fiber guide 13 and the optical fiber pressing springs 11 and 12 are patterned on the resist layer 15 by photolithography, and the resist layer 15 on a part to be removed by etching is removed (see FIGS. 7A and 7B).

[Second Step]

Figure 7A:
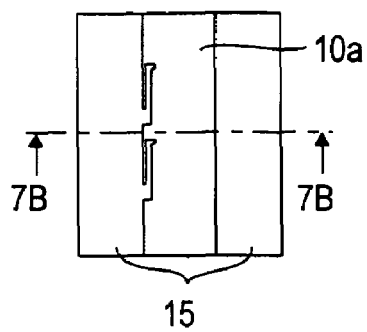
FIGS. 7A to 7H are explanatory drawings showing a method of fabricating a fiber guide and optical fiber pressing springs.
Figure 7B:
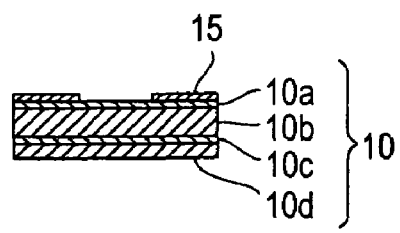
Figure 7C:
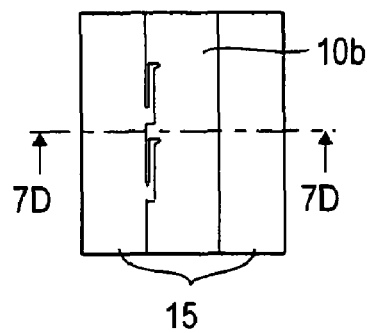
Figure 7D:
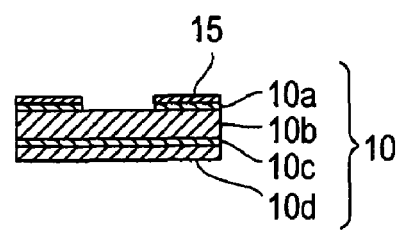

Next, dry etching is performed using a RIE (reactive ion etching) device to remove the insulating layer 10a on a part not covered with the resist layer 15 (see FIGS. 7C and 7D).

[Third Step]

Figure 7E:
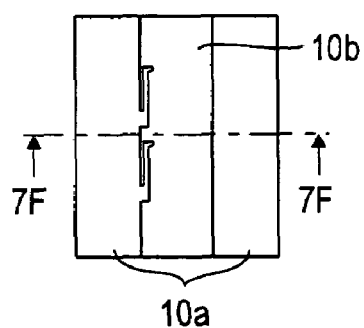
Figure 7F:
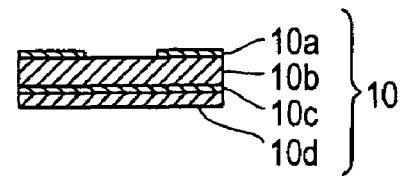
Figure 7G:
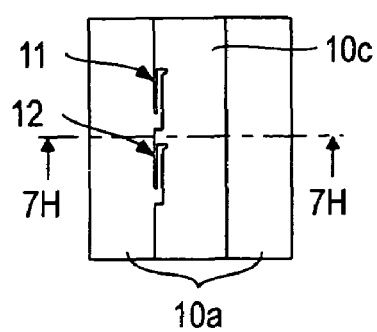
Figure 7H:
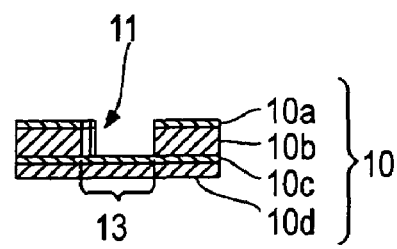

And then, the resist layer 15 is removed (see FIGS. 7E and 7F).

[Fourth Step]

Next, the fiber guide 13 having vertical wall surfaces with a necessary depth and the optical fiber pressing springs 11 and 12 are formed on the silicon layer 10b by deep RIE etching using an ICP (inductively coupled plasma) etching device with the insulating layer 10a acting as a mask. Although deep etching can be performed by a conventional RIE technique in some temperature conditions of the substrate 10 and some plasma conditions, it is convenient to use an ICP device (see FIGS. 7G and 7H).

<Modification>

Although the fiber guide is rectangular in cross section in the present embodiment, the present invention is not limited to this configuration. For example, as described in Japanese Patent Application Laid-Open No. 2005-279919, a groove having a recessed portion on the underside and having side wall surfaces perpendicular to the plane may be used as a fiber guide. Further, the present embodiment described the configuration of the marker groove forming device 1 in which the two optical fiber pressing springs 11 and 12 (N=2) are provided on the side wall surface 13a in the fiber guide 13 (FIG. 1 and so on). However, in the marker groove forming device, three or more optical fiber pressing springs (N≧3) may be provided on the side wall surface 13a in the fiber guide 13. In this case, N marker grooves are formed on an optical fiber.

When three or more optical fiber pressing springs are provided and distances between the edges of the springs are made different from one another, the selection of the marker groove to be cleaved makes it possible to change the distance from the fiber end face formed by the cleavage to the marker groove used for positioning in the axial direction of an optical fiber. An optical fiber in which the distance from the end face to the marker groove used for positioning in the axial direction is thus alternative, has versatility such that it can be used for a plurality of different purposes with different locations of positioning in the axial direction.

Further, if a selection of the marker grooves to be cleaved is made such that two or more marker grooves are left on the cleaved fiber, an optical fiber end part provided with two or more positioning marker grooves can be formed. An optical fiber having two or more marker grooves formed thereon has versatility such that it can be used for a plurality of different purposes with different locations of positioning in the axial direction.

It is needless to say that changes can be made without departing from the gist of the present invention.

Second Embodiment

Next, a second embodiment of the present invention will be described below.

In a marker groove forming device of the present embodiment, N (N≧2) first optical fiber pressing springs are formed on one side wall surface in a fiber guide, and M (1≦M≦N-1) second optical fiber pressing springs are formed on the other side wall surface opposed to the first optical fiber pressing spring in the fiber guide. In the following explanation, differences from the first embodiment will be mainly described and the explanation of matters similar to those of the first embodiment is omitted. In the present embodiment, N=2 and M=1 are set as an example but do not limit the present invention.

<Marker Groove Forming Device 301 of the Present Embodiment>

Figure 8:
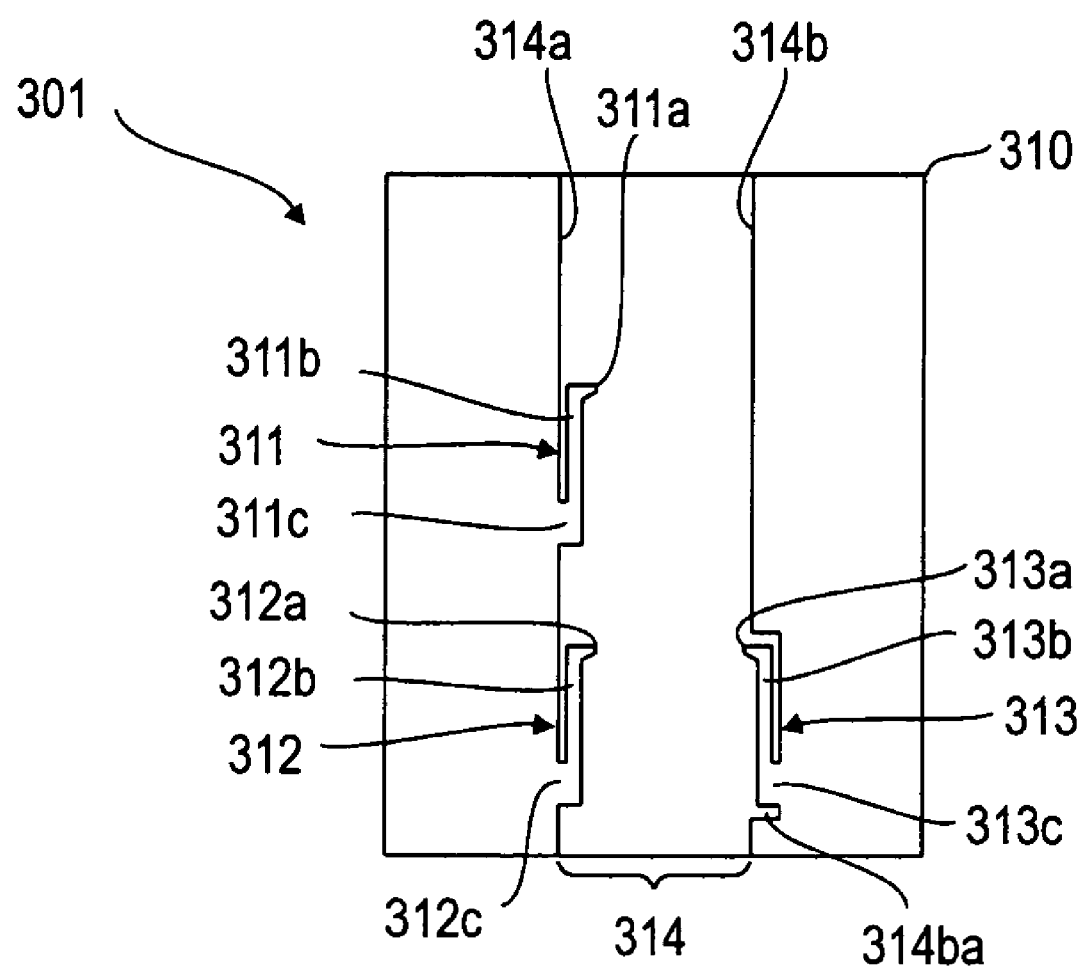
FIG. 8 is a plan view showing the configuration of a marker groove forming device according to a second embodiment.

FIG. 8 is a plan view showing the configuration of a marker groove forming device 301 of the second embodiment.

As shown in FIG. 8, the marker groove forming device 301 of the present embodiment comprises at least, on a substrate 310, a fiber guide 314 which is a groove having side wall surfaces 314a and 314b perpendicular to the plane of the substrate 310 and supports the side of a stored optical fiber by the inner wall surface, two optical fiber pressing springs 311 and 312 (both corresponding to "a first optical fiber pressing spring") formed on the side wall surface 314a in the fiber guide 314, and an optical fiber pressing spring 313 (corresponding to a "second optical fiber pressing spring") formed on the side wall surface 314b.

As shown in FIG. 8, the optical fiber pressing springs 311 and 312 have formed, respectively, edges 311a and 312a (both corresponding to a "first edge") to be contacted and pressed to the side of an optical fiber stored in the fiber guide 314, and plate springs 311b and 312b (both corresponding to a "first plate spring") for pressing the edges 311a and 312a to the side of the optical fiber with fulcra 311c and 312c on the side wall surface 314a in the fiber guide 314.

The optical fiber pressing spring 313 has formed an edge 313a (corresponding to a "second edge") to be contacted and pressed to the side of the optical fiber stored in the fiber guide 314, and a plate spring 313b (corresponding to a "third plate spring") for pressing the edge 313a to the side of the optical fiber with a fulcrum 313c on the side wall surface 314b in the fiber guide 314. As shown in FIG. 8, the side wall surface 314b in the fiber guide 314 of this example includes a recessed portion 314ba. The optical fiber pressing spring 313 is formed such that the inner surface of the recessed portion 314ba serves as the fulcrum 313c. The plate spring 313b is disposed inside the recessed portion 314ba and only the end of the edge 313a protrudes from the recessed portion 314ba to the side wall surface 314a. Further, the optical fiber pressing spring 313 is configured such that the position of the edge 313a in the axial direction of the fiber guide 314 is exactly the same as the one of the edge 312a of the optical fiber pressing spring 312. In other words, a plane passing through the edge 312a and the edge 313a is perpendicular to the axis of the fiber guide 314.

The optical fiber pressing spring 313 and the recessed portion 314ba can be formed by the same method as of the optical fiber pressing springs 11 and 12 and the fiber guide 13 according to the first embodiment.

With this configuration, the optical fiber pressing springs 311 and 312 press the optical fiber stored in the fiber guide 314 to the side wall surface 314b opposed to the optical fiber pressing springs 311 and 312 in the fiber guide 314, and the optical fiber has one side contacted to the side wall surface 314b in the fiber guide 314 throughout the length in the axial direction. Thus the side wall surface 314b acts as the reference for correctly determining a position in direction perpendicular to the axis of the optical fiber.

<Method of Forming an End Part of the Optical Fiber According to the Present Embodiment>

The following is a method of forming an end of the optical fiber according to the present embodiment.

Figure 9A:
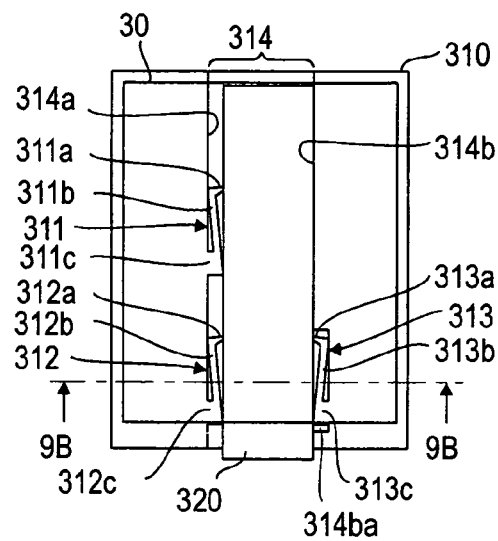
FIGS. 9A to 9F are explanatory drawings showing the steps of forming a cleaving marker groove and an end face positioning marker groove on an end of an optical fiber.
Figure 9B:
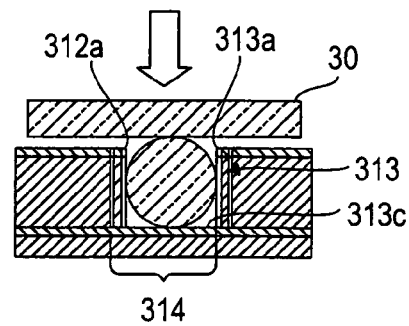
Figure 9C:
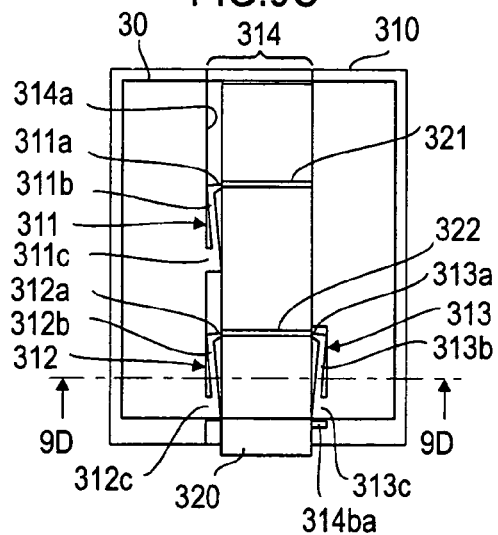
Figure 9D:
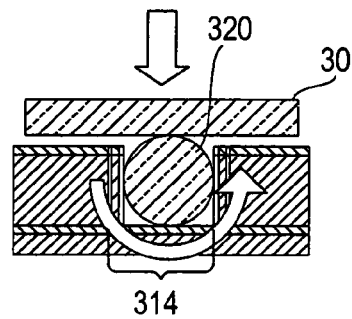
Figure 9E:
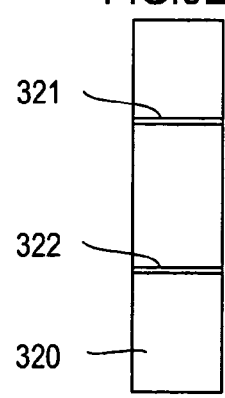
Figure 9F:
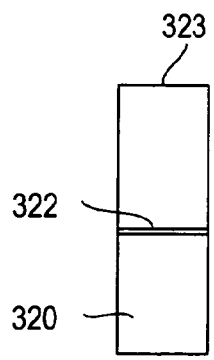

FIGS. 9A to 9F are explanatory drawings showing the steps of forming the cleaving marker groove and the end face positioning marker groove on an end part of the optical fiber. FIGS. 9A and 9C are plan views showing the marker groove forming device 301 in a first step. FIGS. 9B and 9D are sectional views taken along lines 9B-9B and 9D-9D of FIGS. 9A and 9C. FIGS. 9E and 9F are plan views showing the marker groove forming device 301 in a second step.

[First Step]

In the first step, the cleaving marker groove and the end face positioning marker groove are formed on an end part of the optical fiber by using the marker groove forming device 301 of the present embodiment. In the first step of the present embodiment, an optical fiber 320 stored in the fiber guide 314 is rotated about the axis by an angle larger than 0° and smaller than 360°. Thus the edges 311a, 312a and 313a of the optical fiber pressing springs 311, 312 and 313 cut the outer periphery of the cladding of the optical fiber 320 to form two parallel marker grooves spaced at a predetermined interval from each other (an interval between the edges 311a and 312a) on the optical fiber 320. The following will further describe the first step.

First, the optical fiber 320 is stored in the fiber guide 314 of the marker groove forming device 301. As in the first embodiment, the optical fiber 320 is stored as follows: the optical fiber 320 is placed on the fiber guide 314, and then the side of the optical fiber 320 is pressed to the underside of the fiber guide 314 by means of a glass plate 30 as shown in FIG. 9B. In this storing process, the side of the optical fiber 320 presses the edges 311a and 311b of the optical fiber pressing springs 311 and 312 to the side wall surface 314a and presses, to the side wall surface 314b, the edge 313a of the optical fiber pressing spring 313 into the recessed portion 314ba. Conversely, the edges 311a and 312a press the side of the optical fiber 320 to the side wall surface 314b by an elastic force applied from the plate springs 311b and 312b with the fulcra 311c and 312c on the side wall surface 314a, and the edge 313a presses the side of the optical fiber 320 to the side wall surface 314a by an elastic force applied from the plate spring 313b with the fulcrum 313c on the inner surface of the recessed portion 314ba of the side wall surface 314b.

As shown in FIGS. 9A and 9B, the optical fiber 320 stored in the fiber guide 314 is supported by the underside 314c and the side wall surface 314b of the fiber guide 314, the edges 311a, 312a, and portions around the fulcra 311c and 312c of the plate springs 311b and 312b. In this configuration, since the optical fiber pressing spring 313 is provided in the recessed portion 314ba of the side wall surface 314b, the side of the optical fiber 320 on the side wall surface 314b is contacted to the flat side wall surface 314b other than the recessed portion 314ba, so that the end part of the optical fiber 320 is extended straight while being stored in the fiber guide 314. Since the end part of the optical fiber 320 is thus extended straight while being stored in the fiber guide 314 the marker grooves can be formed with high accuracy.

Next, as in the first embodiment, the glass plate 30 is kept pressed to the portion of the side surface of the optical fiber 320 placed out of the fiber guide 314, and as shown in FIGS. 9C and 9D, the optical fiber 320 is rotated about the axis in this state by an angle larger than 0° and smaller than 360° under the kept pressure. Consequently, the edges 311a, 312a and 313a of the optical fiber pressing springs 311, 312 and 313, which are contacted and pressed to the side of the optical fiber 320, cut the outer periphery of the cladding of the optical fiber 320. As a result, parallel cleaving marker groove 321 and end face positioning marker groove 322 are formed on the outer periphery of the cladding of the optical fiber 320 being spaced at an interval equal to that between the edges 311a and 312a.

The marker grooves formed by the edges 312a and 313a, which are on the same position in the axial direction of the fiber guide 314, belong to the same plane perpendicular to the axis of the optical fiber 320. On the other hand, on the same plane as the marker groove formed by the edge 311a, whose position in the axial direction of the fiber guide 314 is not equal to the one of the edge 313a, belongs to, no other marker grooves are present. In this case, the marker groove formed by the edge 311a is selected as the cleaving marker groove 321 and the maker grooves formed by the edges 312a and 313a serve as the end face positioning marker groove 322.

As described above, the optical fiber 320 is rotated about the axis by an angle larger than 0° and smaller than 360°. Consequently, the cleaving marker groove 321 formed by the edge 311a is shorter than the sum of the end face positioning maker grooves 322 formed by the edges 312a and 313a. Particularly when the optical fiber 320 is rotated about the axis by an angle not smaller than 180° and smaller than 360°, the end face positioning marker grooves 322 cut by the edges 312a and 313a are connected to each other. In this case, the end face positioning marker groove 322 is formed all around the axis of the optical fiber 320, while the cleaving marker groove 321 is not formed all around the optical fiber 320 by the edge 311a.

With this configuration, it is possible to obtain the end face positioning marker groove 322 with a necessary length while minimizing the length of the cleaving marker groove 321.

Generally, a marker groove formed around the outer periphery of the cladding is not necessary to cleave the optical fiber and, in fact, a short marker groove is more preferable. This is because an optical fiber can be cleaved by a short marker groove formed outside the cladding and too long a marker groove may possibly cleave the optical fiber creating a plurality of cleavage surfaces and is thus more likely to cause an uneven end face on the optical fiber. For positioning, on the contrary, a long marker groove is preferable and a marker groove formed all around the outer periphery of the cladding is most desirable. This is because as the positioning marker groove increases, the applicability of the positioning marker groove becomes wider. Particularly when a positioning marker groove is formed all around the outer periphery of the cladding, the positioning marker groove can be used in any directions around an optical fiber. Thus it is desirable to form the cleaving marker groove 321 and the positioning marker groove 322 on the outer periphery of the optical fiber 320 by using the marker groove forming device 301 of the present embodiment. To be specific, by using the marker groove forming device 301 and the method of the present embodiment, it is possible to accurately cleave the optical fiber with the cleaving marker groove 321 while obtaining the end face positioning marker groove 322 with a necessary length.

As in the first embodiment, it is desirable to hold and rotate the optical fiber 320 about the axis at a point as close to the substrate 310 as possible.

[Second Step]

After the first step, a second step is performed.

As shown in FIGS. 9E and 9F, in the second step, of the parallel marker grooves having been formed on the optical fiber 320 in the first step, the cleaving marker groove 321 formed only by the edge 311a whose position in the axial direction of the fiber guide 314 is not equal to the one of the edge 313a is cleaved to form an end face of the optical fiber. This process corresponds to the following process: of marker grooves formed by a first edge, the marker groove on a plane not having a marker groove formed thereon by a second edge is cleaved to form an optical fiber end face. Thus, as shown in FIG. 9F, the optical fiber 320 is formed with an end part on which the end face positioning marker groove 322 is formed on the outer periphery of the cladding by cutting on a position spaced at a predetermined distance from the end face in the axial direction.

<Modification and so on>

Although the fiber guide is rectangular in cross section in the present embodiment, the present invention is not limited to this configuration. For example, as described in Japanese Patent Application Laid-Open No. 2005-279919, a groove having a recessed portion on the underside and having side wall surfaces perpendicular to the plane may be used as a fiber guide.

Further, in the present embodiment, the two (N=2) optical fiber pressing springs 311 and 312 are provided on the side wall surface 314a in the fiber guide 314 and the single optical fiber pressing spring 313 is provided on the other side wall surface 314b (FIG. 8 and so on). However, N (N≧2) first optical fiber pressing springs may be provided on the side wall surface 314a in the fiber guide 314, while M (1≦M≦N−1) second optical fiber pressing springs may be provided on the opposed side wall surface 314b, provided that and the position of each edges of all the second optical fiber pressing springs in the axial direction of the fiber guide 314 is equal to each one of any M edges of the first optical fiber pressing springs, respectively. In other words, a configuration is possible wherein each second edges of all the second optical fiber pressing springs is arranged respectively on one of the M planes, the each of which passes respectively through one of the first edges of any M first optical fiber pressing springs and is perpendicular to the two side wall surfaces of the fiber guide. In this case, it is possible to form M end face positioning marker grooves and N−M cleaving marker grooves on the optical fiber, thereby forming an optical fiber end part having marker grooves formed thereon with high versatility as described in the first embodiment.

It is needless to say that changes can be made without departing from the gist of the present invention.

The application field of the present invention is, for example, positioning in the axial direction of an optical fiber. To be specific, for example, the application field of the present invention includes positioning in the axial direction of the optical fiber during the fabrication of an optical fiber module, positioning for connecting a rod-like lens to an end face of an optical fiber to form an optical fiber end having the rod-like lens, and positioning for diagonally polishing an end face of an optical fiber end having a lens.

What is claimed is:

1. A method of forming an end part of an optical fiber, comprising:
    a first step of rotating the end part of the optical fiber about an axis, the optical fiber being stored in a fiber guide of a marker groove forming device, that comprises the fiber guide and N first optical fiber pressing springs formed on a substrate, wherein N is greater than or equal to two, and cutting an outer periphery of a cladding of the optical fiber by first edges of the first optical fiber pressing springs, and forming N parallel marker grooves at predetermined intervals on the optical fiber, wherein:
        the fiber guide is a groove having two side wall surfaces perpendicular to a plane of the substrate and supporting a side of a stored optical fiber by an inner wall surface,
        the first optical fiber pressing springs are formed on one of the side wall surfaces of the fiber guide,
        each first optical fiber pressing spring includes a first plate spring formed on said one of the side wall surfaces and a respective first edge formed on the first plate spring on a side of a central direction of the fiber guide,
        each first plate spring presses its first edge to the side of the optical fiber stored in the fiber guide with a fulcrum on said one of the side wall surfaces, and
        the first edges are spaced at predetermined distances from each other in an axial direction of the fiber guide; and
    a second step of forming an end face of the optical fiber by cleaving one of the N parallel marker grooves formed on the optical fiber.

2. A method of forming an end part of an optical fiber, comprising:
    a first step of rotating the end part of the optical fiber about an axis by an angle larger than 0° and smaller than 360°, the optical fiber being stored in a fiber guide of a marker groove forming device that comprises the fiber guide, N first optical fiber pressing springs formed on a substrate, and M second optical fiber pressing springs, wherein N is greater than or equal to two and M is greater than or equal to one and less than N, and cutting an outer periphery of a cladding of the optical fiber by first edges of the first optical fiber pressing springs and second edges of the second optical fiber pressing springs, and forming a plurality of parallel marker grooves at predetermined intervals on the optical fiber, wherein:
        the fiber guide is a groove having two side wall surfaces perpendicular to a plane of the substrate and supporting a side of a stored optical fiber by an inner wall surface,
        the first optical fiber pressing springs are formed on one of the side wall surfaces of the fiber guide,
        each first optical fiber pressing spring includes a first plate spring formed on said one of the side wall surfaces and a respective first edge formed on the first plate spring on a side of a central direction of the fiber guide,
        each first plate spring presses its first edge to the side of the optical fiber stored in the fiber guide with a fulcrum on said one of the side wall surfaces, the first edges are spaced at predetermined distances from each other in an axial direction of the fiber guide, the second optical fiber pressing springs are formed on a side wall surface opposed to the side wall surface having the first optical fiber pressing springs formed thereon in the fiber guide, each second optical fiber pressing spring includes a second plate spring formed on the side wall surface opposed to the side wall surface having the first optical fiber pressing springs formed thereon in the fiber guide and includes a respective second edge formed on the second plate spring on the side of the central direction of the fiber guide, each second plate spring presses its second edge to the side of the optical fiber stored in the fiber guide with a fulcrum on the side wall surface opposed to the side wall surface having the first optical fiber pressing springs formed thereon in the fiber guide, and each of the second edges of all the second optical fiber pressing springs is disposed on any one of M planes, each of the M planes passing through any one of the first edges of M of the first optical fiber pressing springs and perpendicular to an axis of the fiber guide; and a second step of forming an end face of the optical fiber by cleaving one of the marker grooves formed by the first edges, said one marker groove on a plane not including the marker grooves formed by the second edges.

3. The method of forming an end part of an optical fiber according to claim 2, wherein in the first step, the end part of an optical fiber stored in the fiber guide is rotated about the axis by an angle not smaller than 180° and smaller than 360°.

* * * * *